United States Patent
Schmidt

(10) Patent No.: US 11,757,133 B2
(45) Date of Patent: Sep. 12, 2023

(54) LITHIUM SALT MIXTURE AND USES THEREOF AS A BATTERY ELECTROLYTE

(71) Applicant: Arkema France, Colombes (FR)

(72) Inventor: Grégory Schmidt, St Andéol le Château (FR)

(73) Assignee: Arkema France, Colombes (FR)

( * ) Notice: Subject to any disclaimer, the term of this patent is extended or adjusted under 35 U.S.C. 154(b) by 623 days.

(21) Appl. No.: 16/630,223

(22) PCT Filed: Jul. 26, 2018

(86) PCT No.: PCT/FR2018/051912
§ 371 (c)(1),
(2) Date: Jan. 10, 2020

(87) PCT Pub. No.: WO2019/030440
PCT Pub. Date: Feb. 14, 2019

(65) Prior Publication Data
US 2021/0151798 A1    May 20, 2021

(30) Foreign Application Priority Data
Aug. 7, 2017 (FR) ...................................... 1757559

(51) Int. Cl.
*H01M 10/0568* (2010.01)
*H01M 10/0525* (2010.01)
*H01M 10/0567* (2010.01)
*H01M 10/0569* (2010.01)

(52) U.S. Cl.
CPC ... *H01M 10/0568* (2013.01); *H01M 10/0525* (2013.01); *H01M 10/0567* (2013.01); *H01M 10/0569* (2013.01); *H01M 2300/0037* (2013.01); *Y02E 60/10* (2013.01)

(58) Field of Classification Search
CPC ..... H01M 2300/0037; H01M 10/0525; H01M 10/0567; H01M 10/0569; H01M 10/0568; Y02E 60/10

USPC .......................................................... 429/199
See application file for complete search history.

(56) References Cited

U.S. PATENT DOCUMENTS

| | | | |
|---|---|---|---|
| 3,607,020 A | 9/1971 | Smith | |
| 3,907,977 A | 9/1975 | Wiesboeck | |
| 2009/0053598 A1 | 2/2009 | Abe et al. | |
| 2015/0303521 A1* | 10/2015 | Sasaki | H01M 10/0567 429/326 |
| 2016/0126589 A1* | 5/2016 | Xiao | H01M 10/0569 429/126 |
| 2016/0380309 A1* | 12/2016 | Schmidt | H01M 10/0568 429/50 |
| 2018/0034106 A1* | 2/2018 | Schmidt | H01M 10/0568 |
| 2019/0181494 A1* | 6/2019 | Maeda | H01M 10/0569 |

FOREIGN PATENT DOCUMENTS

| | | |
|---|---|---|
| EP | 2 755 273 A2 | 7/2014 |
| FR | 2983466 A1 | 6/2013 |
| JP | S60251109 A | 12/1985 |
| WO | 2010023413 A1 | 3/2010 |
| WO | 2011065502 A1 | 6/2011 |
| WO | 2011149095 A1 | 12/2011 |
| WO | 2013072591 A1 | 5/2013 |
| WO | 2015136199 A1 | 9/2015 |
| WO | 2015158979 A1 | 10/2015 |
| WO | 2016146925 A1 | 9/2016 |

OTHER PUBLICATIONS

International Search Report (with English Translation) and Written Opinion issued in corresponding International Patent Application No. PCT/FR2018/051912, 12 pages (dated Sep. 11, 2018).

\* cited by examiner

*Primary Examiner* — Jonathan G Jelsma
*Assistant Examiner* — Omar M Kekia
(74) *Attorney, Agent, or Firm* — Boone IP Law

(57) ABSTRACT

The present invention concerns a mixture comprising: —lithium bis(fluorosulfonyl)imide; —lithium 2-trifluoromethyl-4,5-dicyano-imidazole; and —lithium hexafluorophosphate; as well as an electrolyte composition comprising said mixture, and their uses.

12 Claims, No Drawings

LITHIUM SALT MIXTURE AND USES THEREOF AS A BATTERY ELECTROLYTE

FIELD OF THE INVENTION

The present patent application relates to a mixture of lithium salts, and to the use thereof as battery electrolyte.

TECHNICAL BACKGROUND

A lithium-ion battery or a Li-sulfur battery comprises at least a negative electrode (anode), a positive electrode (cathode), a separator and an electrolyte. The electrolyte is generally composed of a lithium salt dissolved in a solvent which is generally a mixture of organic carbonates, in order to have a good compromise between the viscosity and the dielectric constant. Additives can subsequently be added in order to improve the stability of the electrolyte salts.

The most widely used salts include $LiPF_6$ (lithium hexafluorophosphate), which has several of the qualities required but exhibits the disadvantage of decomposing to form hydrofluoric acid (HF) by reaction with water. The HF formed can result in a dissolution of the cathode material. The reaction of $LiPF_6$ with the residual water thus affects the longevity of the battery and can cause safety problems, in particular in the context of the use of lithium-ion batteries in privately-owned vehicles.

Other salts have thus been developed, such as LiTFSI (lithium bis(trifluoromethanesulfonyl)imide) and LiFSI (lithium bis(fluorosulfonyl)imide).

In the field of batteries, there exists an ongoing need for the development of novel salts which make it possible to improve the performance qualities of the battery, such as the service life, and/or the electrochemical stability, and/or the cycling stability, and/or the decrease in the irreversible capacity of the battery, and/or the power performance qualities, in particular over a wide temperature range, such as, for example, from −25° C. approximately to 60° C. approximately.

DESCRIPTION OF THE INVENTION

Mixture

The present patent application relates to a mixture comprising (preferably consisting essentially of, and preferentially consisting of):
  lithium bis(fluorosulfonyl)imide (LiFSI);
  lithium 2-trifluoromethyl-4,5-dicyanoimidazolate (LiTDI); and
  lithium hexafluorophosphate ($LiPF_6$).

According to one embodiment, the mixture comprises (preferably consisting essentially of, and preferentially consisting of):
  from 1 mol % to 98 mol % of lithium bis(fluorosulfonyl) imide (LiFSI);
  from 1 mol % to 98 mol % of lithium 2-trifluoromethyl-4,5-dicyanoimidazolate (LiTDI); and
  from 1 mol % to 98 mol % of lithium hexafluorophosphate ($LiPF_6$).

According to the invention, the molar percentages are with respect to the total number of moles of the compounds present in the mixture.

In the context of the invention, the terms "lithium bis (fluorosulfonyl)imide salt", "lithium bis(sulfonyl)imide", "LiFSI", "$LiN(FSO_2)_2$", "lithium bis(sulfonyl)imide" and "lithium bis(fluorosulfonyl)imide" are used equivalently.

In the context of the invention, the "total number of moles of the compounds of the mixture" corresponds to the sum of the number of moles of each compound present in the mixture.

Lithium 2-trifluoromethyl-4,5-dicyanoimidazolate, known under the name LiTDI, has the following structure:

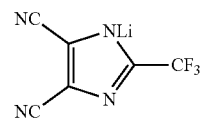

Impurities can be present in the mixtures, in a proportion, for example, of less than 3000 ppm, preferably of less than 1000 ppm, in particular of less than 500 ppm, with respect to the total weight of said mixture.

In the context of the invention, the term "ppm" or "parts per million" is understood to mean ppm by weight.

Impurities may be present in each LiFSI, LiTDI or $LiPF_6$ salt, in a proportion, for example, of less than 3000 ppm, preferably of less than 1000 ppm, in particular of less than 500 ppm, for example of less than 300 ppm relative to the total weight of each salt.

Typically, LiFSI may be obtained according to any known processes, for example by the process described in WO2015/158979, WO2011/065502 or else WO2011/149095.

Typically, LiTDI may be obtained according to any known processes, for example by the process described in WO2013/072591 or WO2010/023413.

Typically, $LiPF_6$ may be obtained according to any known processes, for example by the process described in U.S. Pat. Nos. 3,607,020, 3,907,977 or else in JP60251109.

According to one embodiment, the mixture according to the invention comprises:
  at least 5 mol %, preferably at least 10 mol %, preferentially at least 15 mol %, even more preferentially at least 20 mol %, advantageously at least 25 mol %, and even more advantageously at least 30 mol % of LiFSI; and/or
  at least 5 mol %, preferably at least 10 mol %, preferentially at least 15 mol %, even more preferentially at least 20 mol %, and advantageously at least 25 mol % of LiTDI; and/or
  at least 10 mol %, preferentially at least 15 mol %, even more preferentially at least 20 mol %, and advantageously at least 25 mol % of $LiPF_6$.

According to one embodiment, the content of LiFSI in the mixture according to the invention is chosen from one of the following molar percentages: from 1% to 99%, from 1% to 95%, from 5% to 90%, from 5% to 85%, from 5% to 80%, from 5% to 75%, from 5% to 70%, from 5% to 65%, from 5% to 50%, from 5% to 45%, from 10% to 99%, from 10% to 95%, from 10% to 90%, from 10% to 85%, from 10% to 80%, from 10% to 75%, from 10% to 70%, from 10% to 65%, from 10% to 60%, from 10% to 55%, from 10% to 50%, from 10% to 45%, from 15% to 99%, from 15% to 95%, from 15% to 90%, from 15% to 85%, from 15% to 80%, from 15% to 75%, from 15% to 70%, from 15% to 65%, from 15% to 60%, from 15% to 55%, from 15% to 50%, from 15% to 45%, from 20% to 99%, from 20% to 95%, from 20% to 90%, from 20% to 85%, from 20% to 80%, from 20% to 75%, from 20% to 70%, from 20% to 65%, from 20% to 60%, from 20% to 55%, from 20% to 50%, from 20% to 45%, from 25% to 99%, from 25% to 95%, from 25% to 90%, from 25% to 85%, from 25% to 80%, from 25% to 75%, from 25% to 70%, from 25% to 65%, from 25% to 60%, from 25% to 55%, from 25% to 50%, from 25% to 45%, from 30% to 99%, from 30% to 95%, from 30% to 90%, from 30% to 85%, from 30% to 80%, from 30% to 75%, from 30% to 70%, from 30% to 65%, from 30% to 60%, from 30% to 55%, from 30% to 50%, from 30% to 45%, from 35% to 99%, from 35% to 95%, from 35% to 90%, from 35% to 85%, from 35% to 80%, from 35% to 75%, from 35% to 70%, from 35% to 65%, from 35% to 60%, from 35% to 55%, from 35% to 50%; from 40% to 99%, from 40% to 95%, from 40% to 90%, from 40% to 85%, from 40% to 80%, from 40% to 75%, from 40% to 70%, from 40% to 65%, from 40% to 60%, from 40% to 55%, or from 40% to 50%.

According to one embodiment, the content of LiTDI in the mixture according to the invention is chosen from one of the following molar percentages: from 1% to 99%, from 1% to 95%, from 5% to 90%, from 5% to 85%, from 5% to 80%, from 5% to 75%, from 5% to 70%, from 5% to 65%, from 5% to 50%, from 5% to 45%, from 10% to 99%, from 10% to 95%, from 10% to 90%, from 10% to 85%, from 10% to 80%, from 10% to 75%, from 10% to 70%, from 10% to 65%, from 10% to 60%, from 10% to 55%, from 10% to 50%, from 10% to 45%, from 15% to 99%, from 15% to 95%, from 15% to 90%, from 15% to 85%, from 15% to 80%, from 15% to 75%, from 15% to 70%, from 15% to 65%, from 15% to 60%, from 15% to 55%, from 15% to 50%, from 15% to 45%, from 20% to 99%, from 20% to 95%, from 20% to 90%, from 20% to 85%, from 20% to 80%, from 20% to 75%, from 20% to 70%, from 20% to 65%, from 20% to 60%, from 20% to 55%, from 20% to 50%, from 20% to 45%, from 25% to 99%, from 25% to 95%, from 25% to 90%, from 25% to 85%, from 25% to 80%, from 25% to 75%, from 25% to 70%, from 25% to 65%, from 25% to 60%, from 25% to 55%, from 25% to 50%, from 25% to 45%, from 30% to 99%, from 30% to 95%, from 30% to 90%, from 30% to 85%, from 30% to 80%, from 30% to 75%, from 30% to 70%, from 30% to 65%, from 30% to 60%, from 30% to 55%, from 30% to 50%, from 30% to 45%, from 35% to 99%, from 35% to 95%, from 35% to 90%, from 35% to 85%, from 35% to 80%, from 35% to 75%, from 35% to 70%, from 35% to 65%, from 35% to 60%, from 35% to 55%, from 35% to 50%; from 40% to 99%, from 40% to 95%, from 40% to 90%, from 40% to 85%, from 40% to 80%, from 40% to 75%, from 40% to 70%, from 40% to 65%, from 40% to 60%, from 40% to 55%, or from 40% to 50%.

According to one embodiment, the content of LiPF$_6$ in the mixture according to the invention is chosen from one of the following molar percentages: from 1% to 99%, from 1% to 95%, from 5% to 90%, from 5% to 85%, from 5% to 80%, from 5% to 75%, from 5% to 70%, from 5% to 65%, from 5% to 50%, from 5% to 45%, from 10% to 99%, from 10% to 95%, from 10% to 90%, from 10% to 85%, from 10% to 80%, from 10% to 75%, from 10% to 70%, from 10% to 65%, from 10% to 60%, from 10% to 55%, from 10% to 50%, from 10% to 45%, from 15% to 99%, from 15% to 95%, from 15% to 90%, from 15% to 85%, from 15% to 80%, from 15% to 75%, from 15% to 70%, from 15% to 65%, from 15% to 60%, from 15% to 55%, from 15% to 50%, from 15% to 45%, from 20% to 99%, from 20% to 95%, from 20% to 90%, from 20% to 85%, from 20% to 80%, from 20% to 75%, from 20% to 70%, from 20% to 65%, from 20% to 60%, from 20% to 55%, from 20% to 50%, from 20% to 45%, from 25% to 99%, from 25% to 95%, from 25% to 90%, from 25% to 85%, from 25% to 80%, from 25% to 75%, from 25% to 70%, from 25% to 65%, from 25% to 60%, from 25% to 55%, from 25% to 50%, from 25% to 45%, from 30% to 99%, from 30% to 95%, from 30% to 90%, from 30% to 85%, from 30% to 80%, from 30% to 75%, from 30% to 70%, from 30% to 65%, from 30% to 60%, from 30% to 55%, from 30% to 50%, from 30% to 45%, from 35% to 99%, from 35% to 95%, from 35% to 90%, from 35% to 85%, from 35% to 80%, from 35% to 75%, from 35% to 70%, from 35% to 65%, from 35% to 60%, from 35% to 55%, from 35% to 50%; from 40% to 99%, from 40% to 95%, from 40% to 90%, from 40% to 85%, from 40% to 80%, from 40% to 75%, from 40% to 70%, from 40% to 65%, from 40% to 60%, from 40% to 55%, or from 40% to 50%.

According to one embodiment, the abovementioned mixture comprises (preferably consists essentially of, and preferentially consists of):
 from 5 mol % to 90 mol % of LiFSI;
 from 5 mol % to 90 mol % of LiTDI; and
 from 5 mol % to 90 mol % of LiPF$_6$.

According to one embodiment, the abovementioned mixture comprises (preferably consists essentially of, and preferentially consists of):
 from 20 mol % to 90 mol % of LiFSI;
 from 5 mol % to 60 mol % of LiTDI; and
 from 5 mol % to 60 mol % of LiPF$_6$.

According to one embodiment, the abovementioned mixture comprises (preferably consists essentially of, and preferentially consists of):
 from 30 mol % to 70 mol % of LiFSI;
 from 10 mol % to 50 mol % of LiTDI; and
 from 10 mol % to 50 mol % of LiPF$_6$.

According to one embodiment, the abovementioned mixture comprises (preferably consists essentially of, and preferentially consists of):
 from 35 mol % to 60 mol % of LiFSI;
 from 15 mol % to 50 mol % of LiTDI; and
 from 15 mol % to 50 mol % of LiPF$_6$.

According to one embodiment, the abovementioned mixture comprises (preferably consists essentially of, and preferentially consists of):
 from 35 mol % to 50 mol % of LiFSI;
 from 20 mol % to 40 mol % of LiTDI; and
 from 20 mol % to 40 mol % of LiPF$_6$.

According to one embodiment, the abovementioned mixture comprises (preferably consists essentially of, and preferentially consists of):
 from 35 mol % to 45 mol % of LiFSI;
 from 25 mol % to 35 mol % of LiTDI; and
 from 25 mol % to 35 mol % of LiPF$_6$.

Preferably, the abovementioned mixture comprises (preferably consisting essentially of, and preferentially consists of):
 40 mol % of LiFSI;
 30 mol % of LiTDI; and
 30 mol % of LiPF$_6$.

Preferably, the abovementioned mixture comprises (preferably consists essentially of, and preferentially consists of):
 50 mol % of LiFSI;
 20 mol % of LiTDI; and
 30 mol % of LiPF$_6$.

According to one embodiment, in the mixture according to the invention, the content of LiFSI is greater than or equal to the content of LiTDI, and/or the content of LiPF$_6$ is greater than or equal to LiTDI.

According to one embodiment, the LiFSI/LiTDI/LiPF$_6$ molar ratio is:
- between 1/1/1 and 10/1/1, preferably between 1/1/1 and 5/1/1, preferentially between 1/1/1 and 2/1/1. In particular, the LiFSI/LiTDI/LiPF$_6$ molar ratio is 4/3/3;
- between 1/1/1 and 10/1/1, preferably between 1/1/1 and 1/5/1, preferentially between 1/1/1 and 1/2/1;
- between 1/1/1 and 1/1/10, preferably between 1/1/1 and 1/1/5, preferentially between 1/1/1 and 1/1/2;
- between 5/1/3 and 5/4/3, preferably between 5/1/3 and 5/2/3, preferentially the LiFSI/LiTDI/LiPF$_6$ molar ratio is 5/2/3.

According to one embodiment, the LiFSI/LiPF$_6$ molar ratio in the abovementioned mixture is between 1 and 10, preferably between 1 and 5, preferentially between 1 and 2. Preferably, the LiFSI/LiPF$_6$ molar ratio in the mixture is 4/3 or 5/3.

The present patent application also relates to the use of a mixture as defined above, in a battery, for example a Li-ion battery, in particular in a temperature range of between −30° C. and 65° C., preferentially between −25° C. and 60° C., preferably at a temperature above or equal to 25° C., preferably between 25° C. and 65° C., advantageously between 40° C. and 60° C. For example, the use takes place in mobile devices, for example cellular telephones, cameras, tablets or laptop computers, in electric vehicles or in renewable energy storage.

Electrolyte Composition

The present invention also relates to an electrolyte composition, in particular for a Li-ion battery, comprising the mixture of lithium salts as defined above, at least one solvent and optionally at least one electrolytic additive.

Preferably, the electrolyte composition comprises no alkali metal or alkaline-earth metal salt other than those of the abovementioned mixture.

Preferably, the electrolyte composition comprises no lithium salt other than LiFSI, LiPF$_6$ and LiTDI. In particular, the electrolyte composition comprises no LiTFSI.

Preferably, the LiFSI, LiPF$_6$ and LiTDI salts represent 100% of all of the salts present in the composition.

In the context of the invention, "electrolyte composition", "electrolyte" and "electrolytic composition" are used interchangeably.

According to a preferred embodiment, the electrolyte composition comprises from 1% to 99% by weight of the aforementioned mixture, preferably from 5% to 99%, and advantageously from 20% to 95%, relative to the total weight of the composition.

According to a preferred embodiment, the electrolyte composition comprises from 1% to 99% by weight of solvent, preferably from 5% to 99%, and advantageously from 20% to 95%, relative to the total weight of the composition.

According to one embodiment, the molar concentration of the abovementioned mixture in the electrolyte composition is less than or equal to 5 mol/l, advantageously less than or equal to 4 mol/l, preferably less than or equal to 2 mol/l, preferentially less than or equal to 1.5 mol/l and in particular less than or equal to 1.1 mol/l, for example less than or equal to 1 mol/l.

According to a preferred embodiment, the molar concentrations of LiFSI, LiTDI and LiPF$_6$ in the electrolyte composition are such that:

[LiFSI]+[LiTDI]+[LiPF$_6$]≤5 mol/l, preferably ≤2 mol/l, preferentially ≤1.5 mol/l, even more preferentially ≤1.1 mol/l, for example ≤1 mol/l.

According to one embodiment, the abovementioned electrolyte composition comprises:
- from 0.01 to 0.98 mol/l of LiFSI;
- from 0.01 to 0.98 mol/l of LiTDI; and
- from 0.01 to 0.98 mol/l of LiPF$_6$.

According to one embodiment, the electrolyte composition according to the invention comprises:
- at least 0.05 mol/l, preferably at least 0.1 mol/l, preferentially at least 0.15, even more preferentially at least 0.2 mol/l, advantageously at least 0.25 mol/l, and even more advantageously at least 0.3 mol/l of LiFSI; and/or
- at least 0.05 mol/l, preferably at least 0.1 mol/l, preferentially at least 0.15, even more preferentially at least 0.2 mol/l, advantageously at least 0.25 mol/l, and even more advantageously at least 0.3 mol/l of LiTDI; and/or
- at least 0.05 mol/l, preferably at least 0.1 mol/l, preferentially at least 0.15, even more preferentially at least 0.2 mol/l, advantageously at least 0.25 mol/l, and even more advantageously at least 0.3 mol/l of LiPF$_6$.

According to one embodiment, the molar concentration of LiFSI in the electrolyte composition is chosen from one of the following concentrations: from 0.01 to 0.99 mol/l, from 0.01 to 0.95 mol/l, from 0.05 to 0.90 mol/l, from 0.05 to 0.85 mol/l, from 0.05 to 0.80 mol/l, from 0.05 to 0.75 mol/l, from 0.05 to 0.70 mol/l, from 0.05 to 0.65 mol/l, from 0.05 to 0.50 mol/l, from 0.05 to 0.45 mol/l, 0.1 to 0.99 mol/l, from 0.1 to 0.95 mol/l, from 0.1 to 0.90 mol/l, from 0.1 to 0.85 mol/l, from 0.1 to 0.80 mol/l, from 0.1 to 0.75 mol/l, from 0.1 to 0.70 mol/l, from 0.1 to 0.65 mol/l, from 0.1 to 0.50 mol/l, from 0.1 to 0.45 mol/l, 0.15 to 0.99 mol/l, from 0.15 to 0.95 mol/l, from 0.15 to 0.90 mol/l, from 0.15 to 0.85 mol/l, from 0.15 to 0.80 mol/l, from 0.15 to 0.75 mol/l, from 0.15 to 0.70 mol/l, from 0.15 to 0.65 mol/l, from 0.15 to 0.50 mol/l, from 0.15 to 0.45 mol/l, 0.20 to 0.99 mol/l, from 0.20 to 0.95 mol/l, from 0.20 to 0.90 mol/l, from 0.20 to 0.85 mol/l, from 0.20 to 0.80 mol/l, from 0.20 to 0.75 mol/l, from 0.20 to 0.70 mol/l, from 0.20 to 0.65 mol/l, from 0.20 to 0.50 mol/l, from 0.20 to 0.45 mol/l, 0.25 to 0.99 mol/l, from 0.25 to 0.95 mol/l, from 0.25 to 0.90 mol/l, from 0.25 to 0.85 mol/l, from 0.25 to 0.80 mol/l, from 0.25 to 0.75 mol/l, from 0.25 to 0.70 mol/l, from 0.25 to 0.65 mol/l, from 0.25 to 0.50 mol/l, from 0.25 to 0.45 mol/l, from 0.30 to 0.99 mol/l, from 0.30 to 0.95 mol/l, from 0.30 to 0.90 mol/l, from 0.30 to 0.85 mol/l, from 0.30 to 0.80 mol/l, from 0.30 to 0.75 mol/l, from 0.30 to 0.70 mol/l, from 0.30 to 0.65 mol/l, from 0.30 to 0.50 mol/l, from 0.30 to 0.45 mol/l, from 0.35 to 0.99 mol/l, from 0.35 to 0.95 mol/l, from 0.35 to 0.90 mol/l, from 0.35 to 0.85 mol/l, from 0.35 to 0.80 mol/l, from 0.35 to 0.75 mol/l, from 0.35 to 0.70 mol/l, from 0.35 to 0.65 mol/l, from 0.35 to 0.50 mol/l, from 0.35 to 0.45 mol/l, from 0.40 to 0.99 mol/l, from 0.40 to 0.95 mol/l, from 0.40 to 0.90 mol/l, from 0.40 to 0.85 mol/l, from 0.40 to 0.80 mol/l, from 0.40 to 0.75 mol/l, from 0.40 to 0.70 mol/l, from 0.40 to 0.65 mol/l, from 0.40 to 0.60 mol/l, from 0.40 to 0.55 mol/l, or from 0.40 to 0.50 mol/l.

According to one embodiment, the molar concentration of LiTDI in the electrolyte composition is chosen from one of the following concentrations: from 0.01 to 0.99 mol/l, from 0.01 to 0.95 mol/l, from 0.05 to 0.90 mol/l, from 0.05 to 0.85 mol/l, from 0.05 to 0.80 mol/l, from 0.05 to 0.75 mol/l, from 0.05 to 0.70 mol/l, from 0.05 to 0.65 mol/l, from 0.05 to 0.50 mol/l, from 0.05 to 0.45 mol/l, 0.1 to 0.99 mol/l, from 0.1 to 0.95 mol/l, from 0.1 to 0.90 mol/l, from 0.1 to 0.85 mol/l, from 0.1 to 0.80 mol/l, from 0.1 to 0.75 mol/l, from 0.1 to 0.70 mol/l, from 0.1 to 0.65 mol/l, from 0.1 to 0.50 mol/l, from 0.1 to 0.45 mol/l, 0.15 to 0.99 mol/l, from 0.15 to 0.95 mol/l, from 0.15 to 0.90 mol/l, from 0.15 to 0.85 mol/l, from 0.15 to 0.80 mol/l, from 0.15 to 0.75 mol/l, from 0.15 to 0.70 mol/l, from 0.15 to 0.65 mol/l, from 0.15 to 0.50 mol/l, from 0.15 to 0.45 mol/l, 0.20 to 0.99 mol/l, from 0.20 to 0.95 mol/l, from 0.20 to 0.90 mol/l, from 0.20 to 0.85 mol/l, from 0.20 to 0.80 mol/l, from 0.20 to 0.75 mol/l, from 0.20 to 0.70 mol/l, from 0.20 to 0.65 mol/l, from 0.20 to 0.50 mol/l, from 0.20 to 0.45 mol/l, 0.25 to 0.99 mol/l, from 0.25 to 0.95 mol/l, from 0.25 to 0.90 mol/l, from 0.25 to 0.85 mol/l, from 0.25 to 0.80 mol/l, from 0.25 to 0.75 mol/l, from 0.25 to 0.70 mol/l, from 0.25 to 0.65 mol/l, from 0.25 to 0.50 mol/l, from 0.25 to 0.45 mol/l, from 0.30 to 0.99 mol/l, from 0.30 to 0.95 mol/l, from 0.30 to 0.90 mol/l, from 0.30 to 0.85 mol/l, from 0.30 to 0.80 mol/l, from 0.30 to 0.75 mol/l, from 0.30 to 0.70 mol/l, from 0.30 to 0.65 mol/l, from 0.30 to 0.50 mol/l, from 0.30 to 0.45 mol/l, from 0.35 to 0.99 mol/l, from 0.35 to 0.95 mol/l, from 0.35 to 0.90 mol/l, from 0.35 to 0.85 mol/l, from 0.35 to 0.80 mol/l, from 0.35 to 0.75 mol/l, from 0.35 to 0.70 mol/l, from 0.35 to 0.65 mol/l, from 0.35 to 0.50 mol/l, from 0.35 to 0.45 mol/l, from 0.40 to 0.99 mol/l, from 0.40 to 0.95 mol/l, from 0.40 to 0.90 mol/l, from 0.40 to 0.85 mol/l, from 0.40 to 0.80 mol/l, from 0.40 to 0.75 mol/l, from 0.40 to 0.75 mol/l, from 0.40 to 0.70 mol/l, from 0.40 to 0.65 mol/l, from 0.40 to 0.60 mol/l, from 0.40 to 0.55 mol/l, or from 0.40 to 0.50 mol/l.

According to one embodiment, the molar concentration of $LiPF_6$ in the electrolyte composition is chosen from one of the following concentrations: from 0.01 to 0.99 mol/l, from 0.01 to 0.95 mol/l, from 0.05 to 0.90 mol/l, from 0.05 to 0.85 mol/l, from 0.05 to 0.80 mol/l, from 0.05 to 0.75 mol/l, from 0.05 to 0.70 mol/l, from 0.05 to 0.65 mol/l, from 0.05 to 0.50 mol/l, from 0.05 to 0.45 mol/l, 0.1 to 0.99 mol/l, from 0.1 to 0.95 mol/l, from 0.1 to 0.90 mol/l, from 0.1 to 0.85 mol/l, from 0.1 to 0.80 mol/l, from 0.1 to 0.75 mol/l, from 0.1 to 0.70 mol/l, from 0.1 to 0.65 mol/l, from 0.1 to 0.50 mol/l, from 0.1 to 0.45 mol/l, 0.15 to 0.99 mol/l, from 0.15 to 0.95 mol/l, from 0.15 to 0.90 mol/l, from 0.15 to 0.85 mol/l, from 0.15 to 0.80 mol/l, from 0.15 to 0.75 mol/l, from 0.15 to 0.70 mol/l, from 0.15 to 0.65 mol/l, from 0.15 to 0.50 mol/l, from 0.15 to 0.45 mol/l, 0.20 to 0.99 mol/l, from 0.20 to 0.95 mol/l, from 0.20 to 0.90 mol/l, from 0.20 to 0.85 mol/l, from 0.20 to 0.80 mol/l, from 0.20 to 0.75 mol/l, from 0.20 to 0.70 mol/l, from 0.20 to 0.65 mol/l, from 0.20 to 0.50 mol/l, from 0.20 to 0.45 mol/l, 0.25 to 0.99 mol/l, from 0.25 to 0.95 mol/l, from 0.25 to 0.90 mol/l, from 0.25 to 0.85 mol/l, from 0.25 to 0.80 mol/l, from 0.25 to 0.75 mol/l, from 0.25 to 0.70 mol/l, from 0.25 to 0.65 mol/l, from 0.25 to 0.50 mol/l, from 0.25 to 0.45 mol/l, from 0.30 to 0.99 mol/l, from 0.30 to 0.95 mol/l, from 0.30 to 0.90 mol/l, from 0.30 to 0.85 mol/l, from 0.30 to 0.80 mol/l, from 0.30 to 0.75 mol/l, from 0.30 to 0.70 mol/l, from 0.30 to 0.65 mol/l, from 0.30 to 0.50 mol/l, from 0.30 to 0.45 mol/l, from 0.35 to 0.99 mol/l, from 0.35 to 0.95 mol/l, from 0.35 to 0.90 mol/l, from 0.35 to 0.85 mol/l, from 0.35 to 0.80 mol/l, from 0.35 to 0.75 mol/l, from 0.35 to 0.70 mol/l, from 0.35 to 0.65 mol/l, from 0.35 to 0.50 mol/l, from 0.35 to 0.45 mol/l, from 0.40 to 0.99 mol/l, from 0.40 to 0.95 mol/l, from 0.40 to 0.90 mol/l, from 0.40 to 0.85 mol/l, from 0.40 to 0.80 mol/l, from 0.40 to 0.75 mol/l, from 0.40 to 0.75 mol/l, from 0.40 to 0.70 mol/l, from 0.40 to 0.65 mol/l, from 0.40 to 0.60 mol/l, from 0.40 to 0.55 mol/l, or from 0.40 to 0.50 mol/l.

According to one embodiment, the electrolyte composition comprises:
from 0.05 to 0.90 mol/l of LiFSI;
from 0.05 to 0.90 mol/l of LiTDI; and
from 0.05 to 0.90 mol/l of $LiPF_6$.

According to one embodiment, the electrolyte composition comprises:
from 0.2 to 0.90 mol/l of LiFSI;
from 0.05 to 0.60 mol/l of LiTDI; and
from 0.05 to 0.60 mol/l of $LiPF_6$.

According to one embodiment, the electrolyte composition comprises:
from 0.3 to 0.70 mol/l of LiFSI;
from 0.1 to 0.50 mol/l of LiTDI; and
from 0.1 to 0.50 mol/l of $LiPF_6$.

According to one embodiment, the electrolyte composition comprises:
from 0.35 to 0.60 mol/l of LiFSI;
from 0.15 to 0.50 mol/l of LiTDI; and
from 0.15 to 0.50 mol/l of $LiPF_6$.

According to one embodiment, the electrolyte composition comprises:
from 0.35 to 0.50 mol/l of LiFSI;
from 0.20 to 0.40 mol/l of LiTDI; and
from 0.20 to 0.40 mol/l of $LiPF_6$.

According to one embodiment, the electrolyte composition comprises:
from 0.35 to 0.45 mol/l of LiFSI;
from 0.25 to 0.35 mol/l of LiTDI; and
from 0.25 to 0.35 mol/l of $LiPF_6$.

According to one embodiment, the electrolyte composition comprises:
0.40 mol/l of LiFSI;
0.30 mol/l of LiTDI; and
0.30 mol/l of $LiPF_6$.

According to one embodiment, the electrolyte composition comprises:
0.50 mol/l of LiFSI;
0.20 mol/l of LiTDI; and
0.30 mol/l of $LiPF_6$.

According to one embodiment, the abovementioned electrolyte composition is such that:
the molar concentration of LiFSI is greater than or equal to 0.30 mol/l, and/or
the molar concentration of LiTDI is greater than or equal to 0.40 mol/l, and/or
the molar concentration of $LiPF_6$ is less than or equal to 0.50 mol/l.

According to one embodiment, the abovementioned electrolyte composition is such that the molar concentration of LiFSI is greater than or equal to the molar concentration of LiTDI, and/or the molar concentration of $LiPF_6$ is greater than or equal to that of LiTDI.

According to one embodiment, the abovementioned electrolyte composition is such that the $LiFSI/LiPF_6$ molar ratio in said composition is between 1/1 and 10/1, preferably between 1/1 and 5/1, preferentially between 1/1 and 2/1. Preferably, the $LiFSI/LiPF_6$ molar ratio in the mixture is 4/3 or 5/3.

According to one embodiment, the electrolyte composition can comprise a solvent or a mixture of solvents, such as, for example, two, three or four different solvents.

The solvent of the electrolyte composition can be a liquid solvent, optionally gelled by a polymer, or a polar polymer solvent optionally plasticized by a liquid.

According to one embodiment, the solvent is an organic solvent, preferably an aprotic organic solvent. Preferably, the solvent is a polar organic solvent.

According to one embodiment, the solvent is chosen from the group consisting of ethers, carbonates, esters, ketones, partially hydrogenated hydrocarbons, nitriles, amides, alcohols, sulfoxides, sulfolane, nitromethane, 1,3-dimethyl-2- imidazolidinone, 1,3-dimethyl-3,4,5,6-tetrahydro-2(1H)-pyrimidinone, 3-methyl-2-oxazolidinone and mixtures thereof.

Mention may be made, among the ethers, of linear or cyclic ethers, such as, for example, dimethoxyethane (DME), methyl ethers of oligoethylene glycols of 2 to 5 oxyethylene units, dioxolane, dioxane, dibutyl ether, tetrahydrofuran and mixtures thereof.

Mention may be made, among the esters, of phosphoric acid esters or sulfite esters.

Mention may be made, for example, of methyl formate, methyl acetate, methyl propionate, ethyl acetate, butyl acetate, γ-butyrolactone or mixtures thereof.

Mention may in particular be made, among the ketones, of cyclohexanone.

Mention may be made, among the alcohols, for example, of ethyl alcohol or isopropyl alcohol.

Mention may be made, among the nitriles, for example, of acetonitrile, pyruvonitrile, propionitrile, methoxypropionitrile, dimethylaminopropionitrile, butyronitrile, isobutyronitrile, valeronitrile, pivalonitrile, isovaleronitrile, glutaronitrile, methoxyglutaronitrile, 2-methylglutaronitrile, 3-methylglutaronitrile, adiponitrile, malononitrile and mixtures thereof.

Among the carbonates, mention may for example be made of cyclic carbonates such as for example ethylene carbonate (EC) (CAS: 96-49-1), propylene carbonate (PC) (CAS: 108-32-7), butylene carbonate (BC) (CAS: 4437-85-8), dimethyl carbonate (DMC) (CAS: 616-38-6), diethyl carbonate (DEC) (CAS: 105-58-8), methyl ethyl carbonate (EMC) (CAS: 623-53-0), diphenyl carbonate (CAS 102-09-0), methyl phenyl carbonate (CAS: 13509-27-8), dipropyl carbonate (DPC) (CAS: 623-96-1), methyl propyl carbonate (MPC) (CAS: 1333-41-1), ethyl propyl carbonate (EPC), vinylene carbonate (VC) (CAS: 872-36-6), fluoroethylene carbonate (FEC) (CAS: 114435-02-8), trifluoropropylene carbonate (CAS: 167951-80-6) or mixtures thereof.

The solvent which is particularly preferred is chosen from the carbonates and mixtures thereof. Mention may in particular be made of the following mixtures:
- ethylene carbonate (EC)/propylene carbonate (PC)/dimethyl carbonate (DMC) in a 1/1/1 weight ratio;
- ethylene carbonate (EC)/propylene carbonate (PC)/diethyl carbonate (DEC) in a 1/1/1 weight ratio;
- ethylene carbonate (EC)/propylene carbonate (PC)/ethyl methyl carbonate (EMC) in a 1/1/1 weight ratio;
- ethylene carbonate (EC)/dimethyl carbonate (DMC) in a 1/1 weight ratio;
- ethylene carbonate (EC)/diethyl carbonate (DEC) in a 1/1 weight ratio;
- ethylene carbonate (EC)/ethyl methyl carbonate (EMC) in a 1/1 weight ratio;
- ethylene carbonate (EC)/dimethyl carbonate (DMC) in a weight ratio in a 3/7 volume ratio;
- ethylene carbonate (EC)/diethyl carbonate (DEC) in a 3/7 volume ratio;
- ethylene carbonate (EC)/ethyl methyl carbonate (EMC) in a 3/7 volume ratio.

Preferably, the solvent of the electrolyte composition is ethylene carbonate (EC)/ethyl methyl carbonate (EMC) in a 3/7 volume ratio.

According to one embodiment, the electrolyte composition comprises at least one electrolytic additive.

Preferably, the electrolytic additive is chosen from the group consisting of fluoroethylene carbonate (FEC), vinylene carbonate, 4-vinyl-1,3-dioxolan-2-one, pyridazine, vinylpyridazine, quinoline, vinylquinoline, butadiene, sebaconitrile, LiB($C_2O_4$)$_2$, lithium nitrate, alkyl disulfides, fluorotoluene, 1,4-dimethoxytetrafluorotoluene, t-butylphenol, di-t-butylphenol, tris(pentafluorophenyl)borane, oximes, aliphatic epoxides, halogenated biphenyls, methacrylic acids, allyl ethyl carbonate, vinyl acetate, divinyl adipate, acrylonitrile, 2-vinylpyridine, maleic anhydride, methyl cinnamate, phosphonates, silane compounds containing a vinyl, 2-cyanofuran and mixtures thereof, the electrolytic additive preferably being fluoroethylene carbonate (FEC).

For example, the content of electrolytic additive in the electrolyte composition is between 0.01% and 10%, preferably between 0.1% and 4%, by weight, relative to the total weight of the electrolyte composition. In particular, the content of electrolytic additive in the electrolyte composition is less than or equal to 2% by weight, relative to the total weight of the composition.

The content of electrolytic additive in the electrolyte composition may for example be between 0.01% and 10%, preferably between 0.1% and 4%, by weight, relative to the total weight of the solvent of said composition.

According to one embodiment, the electrolyte composition according to the invention is chosen from one of the following compositions:
i) 0.40 mol/l of LiFSI, 0.30 mol/l of LiTDI, and 0.30 mol/l of LiPF$_6$, fluoroethylene carbonate as electrolytic additive (in particular at a content of less than or equal to 2% by weight, relative to the total weight of the solvent(s)), mixture of EC/EMC in a 3/7 volume ratio as solvent;
ii) 0.50 mol/l of LiFSI, 0.20 mol/l of LiTDI, and 0.30 mol/l of LiPF$_6$, fluoroethylene carbonate as electrolytic additive (in particular at a content of less than or equal to 2% by weight, relative to the total weight of the solvent(s)), mixture of EC/EMC in a 3/7 volume ratio as solvent;
ii) 0.45 mol/l of LiFSI, 0.20 mol/l of LiTDI, and 0.35 mol/l of LiPF$_6$, fluoroethylene carbonate as electrolytic additive (in particular at a content of less than or equal to 2% by weight, relative to the total weight of the solvent(s)), mixture of EC/EMC in a 3/7 volume ratio as solvent;
ii) 0.50 mol/l of LiFSI, 0.10 mol/l of LiTDI, and 0.40 mol/l of LiPF$_6$, fluoroethylene carbonate as electrolytic additive (in particular at a content of less than or equal to 2% by weight, relative to the total weight of the solvent(s)), mixture of EC/EMC in a 3/7 volume ratio as solvent.

According to one embodiment, the electrolyte composition according to the invention is chosen from one of the following compositions:
i) 0.40 mol/l of LiFSI, 0.30 mol/l of LiTDI, and 0.30 mol/l of LiPF$_6$, fluoroethylene carbonate as electrolytic additive (in particular at a content of less than or equal to 2% by weight, relative to the total weight of the composition), mixture of EC/EMC in a 3/7 volume ratio as solvent;
ii) 0.50 mol/l of LiFSI, 0.20 mol/l of LiTDI, and 0.30 mol/l of LiPF$_6$, fluoroethylene carbonate as electrolytic additive (in particular at a content of less than or equal to 2% by weight, relative to the total weight of the composition), mixture of EC/EMC in a 3/7 volume ratio as solvent;
ii) 0.45 mol/l of LiFSI, 0.20 mol/l of LiTDI, and 0.35 mol/l of LiPF$_6$, fluoroethylene carbonate as electrolytic additive (in particular at a content of less than or equal to 2% by weight, relative to the total weight of the composition), mixture of EC/EMC in a 3/7 volume ratio as solvent;

ii) 0.50 mol/l of LiFSI, 0.10 mol/l of LiTDI, and 0.40 mol/l of LiPF$_6$, fluoroethylene carbonate as electrolytic additive (in particular at a content of less than or equal to 2% by weight, relative to the total weight of the composition), mixture of EC/EMC in a 3/7 volume ratio as solvent.

The electrolyte composition may be prepared by any means known to a person skilled in the art, for example by dissolving, preferably with stirring, the salts in appropriate proportions of solvent(s) and/or additive(s).

The present patent application also relates to the use of an electrolyte composition as defined above in a Li-ion battery, in particular in a temperature range of between −30° C. and 65° C., preferentially between −25° C. and 60° C., preferably at a temperature above or equal to 25° C., preferably between 25° C. and 65° C., advantageously between 40° C. and 60° C. For example, the use takes place in mobile devices, for example cellular telephones, cameras, tablets or laptop computers, in electric vehicles or in renewable energy storage.

Electrochemical Cell

The present patent application also relates to an electrochemical cell comprising a negative electrode, a positive electrode, and a mixture of lithium salts as described above.

The present patent application also relates to an electrochemical cell comprising a negative electrode, a positive electrode and an electrolyte composition as defined here above, interposed between the negative electrode and the positive electrode. The electrochemical cell can also comprise a separator, in which the electrolyte composition as defined above is impregnated.

The present invention also relates to a battery comprising at least one electrochemical cell as described above. When the battery comprises several electrochemical cells according to the invention, said cells can be assembled in series and/or in parallel.

In the context of the invention, negative electrode is understood to mean the electrode which acts as anode when the battery produces current (that is to say, when it is in the process of discharging) and which acts as cathode when the battery is in the process of charging.

The negative electrode typically comprises an electrochemically active material, optionally an electron-conducting material, and optionally a binder.

In the context of the invention, "electrochemically active material" is understood to mean a material capable of reversibly inserting ions.

In the context of the invention, "electron-conducting material" is understood to mean a material capable of conducting electrons.

According to one embodiment, the negative electrode of the electrochemical cell comprises, as electrochemically active material, graphite, lithium, a lithium alloy, a lithium titanate of Li$_4$Ti$_5$O$_{12}$ or TiO$_2$ type, silicon or a lithium/silicon alloy, a tin oxide, a lithium intermetallic compound or one of their mixtures.

The negative electrode can comprise lithium; the latter can then consist of a film of metal lithium or of an alloy comprising lithium. An example of negative electrode can comprise an active lithium film prepared by rolling a strip of lithium between rollers.

In the context of the invention, positive electrode is understood to mean the electrode which acts as cathode when the battery produces current (that is to say, when it is in the process of discharging) and which acts as anode when the battery is in the process of charging.

The positive electrode typically comprises an electrochemically active material, optionally an electron-conducting material, and optionally a binder.

In another embodiment, the positive electrode of the electrochemical cell comprises an electrochemically active material chosen from manganese dioxide (MnO$_2$), iron oxide, copper oxide, nickel oxide, lithium/manganese composite oxides (for example Li$_x$Mn$_2$O$_4$ or Li$_x$MnO$_2$), lithium/nickel composition oxides (for example Li$_x$NiO$_2$), lithium/cobalt composition oxides (for example Li$_x$CoO$_2$), lithium/nickel/cobalt composite oxides (for example LiNi$_{1-y}$Co$_y$O$_2$), lithium/nickel/cobalt/manganese composite oxides (for example LiNi$_x$Mn$_y$Co$_z$O$_2$ with x+y+z=1), lithium-enriched lithium/nickel/cobalt/manganese composite oxides (for example Li$_{1+x}$(NiMnCo)$_{1-x}$O$_2$), lithium/transition metal composite oxides, lithium/manganese/nickel composite oxides of spinel structure (for example Li$_x$Mn$_{2-y}$Ni$_y$O$_4$), lithium/phosphorus oxides of olivine structure (for example Li$_x$FePO$_4$, Li$_x$Fe$_{1-y}$Mn$_y$PO$_4$ or Li$_x$CoPO$_4$), iron sulfate, vanadium oxides and their mixtures.

Preferably, the positive electrode is comprises an electrochemically active material chosen from LiCoO$_2$, LiFePO$_4$ (LFP), LiMn$_x$Co$_y$Ni$_z$O$_2$ (NMC, with x+y+z=1), LiFePO$_4$F, LiFeSO$_4$F, LiNiCoAlO$_2$ and their mixtures.

The material of the positive electrode can also comprise, besides the electrochemically active material, an electron-conducting material, such as a carbon source, including, for example, carbon black, Ketjen® carbon, Shawinigan carbon, graphite, graphene, carbon nanotubes, carbon fibers (such as vapor-grown carbon fibers (VGCF)), non-powdery carbon obtained by carbonization of an organic precursor, or a combination of two or more of these. Other additives can also be present in the material of the positive electrode, such as lithium salts or inorganic particles of ceramic or glass type, or also other compatible active materials (for example sulfur).

The material of the positive electrode can also comprise a binder. Nonlimiting examples of binders comprise linear, branched and/or crosslinked polyether polymer binders (for example polymers based on poly(ethylene oxide) (PEO), or poly(propylene oxide) (PPO) or on a mixture of the two (or an EO/PO copolymer), and optionally comprising crosslinkable units), water-soluble binders (such as SBR (styrene/butadiene rubber), NBR (acrylonitrile/butadiene rubber), HNBR (hydrogenated NBR), CHR (epichlorohydrin rubber), ACM (acrylate rubber)), or binders of fluoropolymer type (such as PVDF (polyvinylidene fluoride), PTFE (polytetrafluoroethylene)), and their combinations. Some binders, such as those which are soluble in water, can also comprise an additive, such as CMC (carboxymethylcellulose).

The mixture of salts according to the invention advantageously has a good ionic conductivity in solution. Furthermore, the mixture of salts according to the invention advantageously makes it possible to improve the power performance qualities of the battery, which makes it possible, for example, to more quickly recharge the battery, or also to provide the power necessary in the event of an energy peak.

The mixture of salts according to the invention also advantageously makes it possible to have good performance qualities, in particular in terms of power, over a wide temperature range, for example under cold conditions, or over a temperature range extending from approximately −25° C. to approximately 60° C.

The mixture of salts according to the invention advantageously enables a good compromise between a good ionic conductivity in solution, a good service life, an electrochemical stability, and power performance qualities, in particular over a wide temperature range, such as, for example, from −25° C. approximately to 60° C. approximately.

In the context of the invention, the term "of between x and y" or "between x and y" is understood to mean an interval in which the limits x and y are included. For example, the range "of between 1% and 98%" or "ranging from 1% to 98%" includes in particular the values 1% and 98%.

All the embodiments described above can be combined with one another.

The following examples illustrate the invention without, however, limiting it.

EXPERIMENTAL SECTION

Abbreviations

EC: ethylene carbonate
EMC: ethyl methyl carbonate (CAS 623-53-0)
FEC: fluoroethylene carbonate
Suppliers
EC: BASF Corporation
EMC: BASF Corporation
FEC: BASF Corporation
$LiPF_6$: BASF Corporation The LiFSI used is obtained in particular by the process described in the application WO2015/158979, while the LiTDI results from the process described in the application WO2013/072591.

Example 1: Ionic Conductivity Measured by Impedance Spectroscopy

Two electrolytes were prepared according to the following compositions:
  composition 1 (according to the invention): 0.40M LiFSI, 0.30M LiTDI and 0.30M $LiPF_6$, 3/7 (volume ratio) EC/EMC solvent mixture, 2% by weight of FEC (relative to the total weight of the EC/EMC solvent mixture);
  composition 2 (comparative): 0.40M LiTFSI, 0.30M LiTDI and 0.30M $LiPF_6$, 3/7 (volume ratio) EC/EMC solvent mixture, 2% by weight of FEC (relative to the total weight of the EC/EMC solvent mixture).

The compositions were prepared according to the following procedure:
Composition 1:
  In a glass reactor, 39.60 g of ethylene carbon (30 ml) are dissolved in 70 ml of ethyl methyl carbonate. After a homogeneous solution is obtained, 2.21 g of fluoroethylene carbonate are added. Next, 4.63 g of $LiPF_6$, 7.60 g of LiFSI and 5.85 g of LiTDI are dissolved in the solution obtained previously.

Thus, composition 1 comprises LiFSI, LiTDI, $LiPF_6$, EC/EMC (3/7 volume ratio), FEC (2% by weight relative to the weight of the 3/7 by volume EC/EMC solvent), the total content of LiFSI in composition 1 being 0.40 mol/l, the total content of LiTDI in composition 1 being 0.30 mol/l, the total content of $LiPF_6$ in the composition being 0.30 mol/l.
Composition 2:
  In a glass reactor, 19.80 g of ethylene carbon (15 ml) are dissolved in 35 ml of ethyl methyl carbonate. After a homogeneous solution is obtained, 1.10 g of fluoroethylene carbonate are added. Next, 2.31 g of $LiPF_6$, 5.83 g of LiTFSI and 2.92 g of LiTDI are dissolved in the solution obtained previously.

A conductivity cell is then immersed in each of the solutions and three impedance spectroscopy determinations were carried out. These spectroscopy determinations are carried out between 500 mHz and 100 kHz with an amplitude of 10 mV. The constant of the cell used is 1.12 and the ionic conductivity is calculated according to the following formula:

$$\sigma = \frac{1}{R} \times 1.12$$

where R represents the resistance which is obtained by linear regression of the curve Im(Z)=f(Re(Z)). In the specific case of Im(Z)=0, R is equal to the opposite of the ordinate at the origin divided by the slope of the linear regression equation.

| Compositions | Conductivity (mS/cm) | R1 | R2 | R3 | Mean R |
|---|---|---|---|---|---|
| Composition 1 (invention) | 8.59 | 129.52 | 130.366 | 131.242 | 130.376 |
| Composition 2 (comparative) | 7.18 | 157.09 | 155.1567 | 155.5815 | 155.943 |

Composition 1 advantageously has a better ionic conductivity than composition 2.

Example 2: Power Test

A Ragone plot test was carried out with the compositions 1 and 2 prepared in example 1.
Method: the method consists in increasing the rate of discharge of a battery in order to observe the ability of the electrolyte to be able to respond to the stress imposed by the electrical circuit.
System Used:
Cathode: $LiNi_{0.33}Mn_{0.33}Co_{0.33}O_2$ (89%), carbon fiber VGCF (2.5%), carbon black (2.5%) and 6% of PVDF binder.
Anode: Lithium metal
  The current was varied between 2.7 and 4.2 V, with the discharges carried out in the following order: C/20, C/10, C/5, C/2, C and 2C.
  Two C/20 formation cycles are carried out before the study in order to form all the passivation layers.
Results:
  The results observed are as follows:

| C rate | Composition 1 | Composition 2 |
|---|---|---|
| C/10 | 100 | 100 |
| C/5 | 101 | 101 |
| C/2 | 99 | 98 |
| C | 96 | 94 |
| 2C | 91 | 88 |
| 5C | 80 | 76 |

The results show that composition 1 advantageously makes it possible to operate at higher power ratings than composition 2. These high ratings are particularly desired in commercial batteries in the context of mobile devices which require ever more power, and electric vehicles which, due to their low operating radius, require rapid recharges and thus electrolytes which make it possible to operate at high ratings.

The invention claimed is:

1. An electrolyte composition, comprising:
    (i) at least three lithium salts, the at least three lithium salts being:
        lithium bis(fluorosulfonyl)imide;
        from 5 mol % to 40 mol % lithium 2-trifluoromethyl-4,5-dicyanoimidazolate; and
        lithium hexafluorophosphate;
    (ii) only one solvent or solvent mixture consisting of ethers, carbonates, esters, ketones, partially hydrogenated hydrocarbons, nitriles, amides, alcohols, nitromethane, 1,3-dimethyl-2-imidazolidinone, 1,3-dimethyl-3,4,5,6-tetrahydro-2(1H)-pyrimidinone and 3-methyl-2-oxazolidinone; and
    (iii) optionally at least one electrolytic additive.

2. The composition as claimed in claim 1, wherein the lithium bis(fluorosulfonyl)imide, lithium hexafluorophosphate and lithium 2-trifluoromethyl-4,5-dicyanoimidazolate salts represent 100% of all of the salts present in the composition.

3. The composition as claimed in claim 1, wherein the molar concentration of the mixture is less than or equal to 5 mol/l.

4. The composition as claimed in claim 1, comprising:
    at least 0.05 mol/l of lithium bis(fluorosulfonyl)imide; and/or
    at least 0.05 mol/l of lithium 2-trifluoromethyl-4,5-dicyanoimidazolate; and/or
    at least 0.05 mol/l of lithium hexafluorophosphate.

5. The composition as claimed in claim 1, comprising:
    i)
        from 0.05 to 0.90 mol/l of lithium bis(fluorosulfonyl)imide;
        from 0.05 to 0.90 mol/l of lithium 2-trifluoromethyl-4,5-dicyanoimidazolate; and
        from 0.05 to 0.90 mol/l of lithium hexafluorophosphate;
    or
    ii)
        from 0.2 to 0.90 mol/l of lithium bis(fluorosulfonyl)imide;
        from 0.05 to 0.60 mol/l of lithium 2-trifluoromethyl-4,5-dicyanoimidazolate; and
        from 0.05 to 0.60 mol/l of lithium hexafluorophosphate;
    or
    iii)
        from 0.3 to 0.70 mol/l of lithium bis(fluorosulfonyl)imide;
        from 0.1 to 0.50 mol/l of lithium 2-trifluoromethyl-4,5-dicyanoimidazolate; and
        from 0.1 to 0.50 mol/l of lithium hexafluorophosphate;
    or
    iv)
        from 0.35 to 0.60 mol/l of lithium bis(fluorosulfonyl)imide;
        from 0.15 to 0.50 mol/l of lithium 2-trifluoromethyl-4,5-dicyanoimidazolate; and
        from 0.15 to 0.50 mol/l of lithium hexafluorophosphate;
    or
    v)
        from 0.35 to 0.50 mol/l of lithium bis(fluorosulfonyl)imide;
        from 0.20 to 0.40 mol/l of lithium 2-trifluoromethyl-4,5-dicyanoimidazolate; and
        from 0.20 to 0.40 mol/l of lithium hexafluorophosphate;
    or
    vi)
        from 0.35 to 0.45 mol/l of lithium bis(fluorosulfonyl)imide;
        from 0.25 to 0.35 mol/l of lithium 2-trifluoromethyl-4,5-dicyanoimidazolate; and
        from 0.25 to 0.35 mol/l of lithium hexafluorophosphate;
    or
    vii)
        0.40 mol/l of lithium bis(fluorosulfonyl)imide;
        0.30 mol/l of lithium 2-trifluoromethyl-4,5-dicyanoimidazolate; and
        0.30 mol/l of lithium hexafluorophosphate;
    or
    viii)
        0.50 mol/l of lithium bis(fluorosulfonyl)imide;
        0.20 mol/l of lithium 2-trifluoromethyl-4,5-dicyanoimidazolate; and
        0.30 mol/l of lithium hexafluorophosphate.

6. The composition as claimed in claim 1, wherein the solvent is a solvent mixture consisting of any combination of ethers, carbonates, esters, ketones, partially hydrogenated hydrocarbons, nitriles, amides, alcohols, nitromethane, 1,3-dimethyl-2-imidazolidinone, 1,3-dimethyl-3,4,5,6-tetrahydro-2(1H)-pyrimidinone, or 3-methyl-2-oxazolidinone.

7. The composition as claimed in claim 1, wherein the solvent is a mixture of carbonates.

8. The composition as claimed in claim 1, wherein the composition comprises the electrolytic additive, wherein the electrolytic additive is chosen from the group consisting of fluoroethylene carbonate, vinylene carbonate, 4-vinyl-1,3-dioxolan-2-one, pyridazine, vinylpyridazine, quinoline, vinylquinoline, butadiene, sebaconitrile, $LiB(C_2O_4)_2$, lithium nitrate, alkyl disulfides, fluorotoluene, 1,4-dimethoxytetrafluorotoluene, t-butylphenol, di-t-butylphenol, tris (pentafluorophenyl)borane, oximes, aliphatic epoxides, halogenated biphenyls, methacrylic acids, allyl ethyl carbonate, vinyl acetate, divinyl adipate, acrylonitrile, 2-vinylpyridine, maleic anhydride, methyl cinnamate, phosphonates, silane compounds containing a vinyl, 2-cyanofuran and mixtures thereof.

9. The composition as claimed in claim 1, chosen from one of the following compositions comprising:
    i) 0.40 mol/l of lithium bis(fluorosulfonyl)imide, 0.30 mol/l of lithium 2-trifluoromethyl-4,5-dicyanoimidazolate, and 0.30 mol/l of $LiPF_6$, with fluoroethylene carbonate as the optional electrolytic additive;
    ii) 0.50 mol/l of lithium bis(fluorosulfonyl)imide, 0.20 mol/l of lithium 2-trifluoromethyl-4,5-dicyanoimidazolate, and 0.30 mol/l of $LiPF_6$, with fluoroethylene carbonate as the optional electrolytic additive;
    iii) 0.45 mol/l of lithium bis(fluorosulfonyl)imide, 0.20 mol/l of lithium 2-trifluoromethyl-4,5-dicyanoimidazolate, and 0.35 mol/l of $LiPF_6$, with fluoroethylene carbonate as the optional electrolytic additive;
    iv) 0.50 mol/l of lithium bis(fluorosulfonyl)imide, 0.10 mol/l of lithium 2-trifluoromethyl-4,5-dicyanoimidazolate, and 0.40 mol/l of $LiPF_6$, with fluoroethylene carbonate as the optional electrolytic additive.

10. A Li-battery comprising the composition according to claim 1.

11. An electrochemical cell comprising a negative electrode, a positive electrode and the electrolyte composition as claimed in claim 1, interposed between the negative electrode and the positive electrode.

12. A battery comprising at least one electrochemical cell as claimed in claim 11.

* * * * *